United States Patent Office 3,553,209
Patented Jan. 5, 1971

3,553,209
**3-METHYL-8-(2-THIENYL)PYRAZOLO[4,3-e][1,4]
DIAZEPIN-5(1H)-ONE COMPOUNDS**
Yvon J. L'Italien, Plymouth, and Ivan C. Nordin, Ann
Arbor, Mich., assignors to Parke, Davis & Company,
Detroit, Mich., a corporation of Michigan
No Drawing. Filed Dec. 16, 1968, Ser. No. 784,260
Int. Cl. C07d 53/02
U.S. Cl. 260—239.3
4 Claims

ABSTRACT OF THE DISCLOSURE

3 - methyl-8-(2-thienyl)pyrazolo[4,3-e][1,4]diazepin-5(1H)-one compounds, 7-oxide derivatives thereof, and their salts, substituted in the 1-position by methyl or ethyl and optionally in the 4-position by methyl; and their production by (a) reacting a 4-amino-3-methyl-5-(2-thenoyl)pyrazole with a lower alkyl ester of glycine or a salt thereof, (b) reacting a 4-(2-haloacetamido)-3-methyl-5-(2-thenoyl)pyrazole or a salt thereof with ammonia, (c) reacting a 4-(2-aminoacetamido)-3-methyl-5-(2-thenoyl)pyrazole salt with a base, (d) reacting a 4-[2-(hydroxylamino)acetamido] - 3 - methyl-5-(2-thenoyl)pyrazole with a strong acid, (e) reacting one of the 3-methyl - 8 - (2-thienyl)pyrazolo[4,3-e][1,4]diazepin-5 (1H)-one compounds with an oxidizing agent, and (f) reacting one of the 4-unsubstituted 3-methyl-8-(2-thienyl)-pyrazolo[4,3-e][1,4]diazepin-5(1H) ones or the 7-oxide derivatives thereof with a methylating agent in the presence of a base. The compounds of the invention are useful as anticonvulsant and anti-anxiety agents.

SUMMARY AND DETAILED DESCRIPTION

The present invention relates to new heterocyclic nitrogen compounds that are useful as pharmacological agents and to methods for their production. More particularly, the invention relates to new 3 - methyl - 8-(2-thienyl) pyrazolo-[4,3-e][1,4]diazepin - 5(1H) - one compounds having the formula:

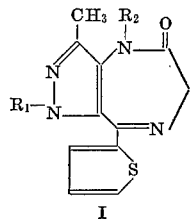

I to new 3-methyl - 8 - (2-thienyl)pyrazolo[4,3-e][1,4]-diazepin-5(1H) - one, 7 - oxide compounds having the formula:

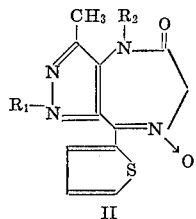

II and to pharmaceutically-acceptable salts of the foregoing compounds; where $R_1$ is methyl or ethyl and $R_2$ is hydrogen or methyl.

In accordance with the invention, 3-methyl-8-(2-thienyl)pyrazolo[4,3-e][1,4]diazepin-5(1H) - one compounds having Formula I above are produced by reacting a 4-amino-3-methyl-5-(2-thenoyl)pyrazole compound having the formula:

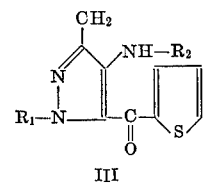

III with a lower alkyl ester of glycine; where each of $R_1$ and $R_2$ is as defined above. The glycine ester may be used in either free base or acid-addition salt form, with the acid-addition salt form being preferred. The individual preferred glycine ester salt is glycine ethyl ester hydrochloride. The reaction is preferably carried out in the presence of a basic catalyst in a basic solvent medium. Suitable catalysts for this purpose are various aliphatic, aromatic, and heterocyclic secondary amines, such as diethylamine, dipropylamine, N-methylaniline, N-ethylaniline, piperidine, pyrrolidine, and mixtures of these. The preferred catalyst is piperidine. Suitable solvents are various tertiary amines, such as triethylamine, teibutylamine, N,N-dimethylaniline, pyridine, quinoline, and mixtures of these. Pyridine is a preferred solvent. The temperature and duration of the reaction are not critical and may be varied widely, the temperature from 50 to 150° C. and the duration from one to about 48 hours. In the preferred pyridine solvent, the reaction is conveniently carried out at the reflux temperature of the reaction mixture and at that temperature is essentially complete after about 16 to 30 hours. Although equivalent quantities of reactants may be employed, best results are obtained with a moderate to large excess of the glycine ester. The amount of secondary amine used as catalyst is not critical.

The 4-amino - 3 - methyl-5-(2-thenoyl)pyrazole compounds having Formula III above that are required as starting materials in the foregoing process can be prepared by a variety of methods. In one method, a 3-methyl-2-pyrazolin-5-one, which can be represented by the equilibrium equation:

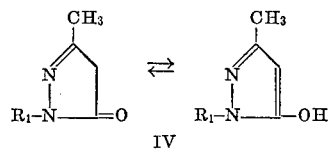

IV is reacted with phosphorus oxychloride to give a 5-chloro-3-methylpyrazole, having the formula:

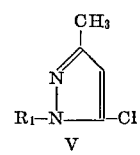

V which is in turn reacted with nitric acid in sulfuric acid to give a 5-chloro-3-methyl-4-nitropyrazole, having the formula:

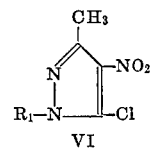

VI

This intermediate is next reacted with sodium cyanide, and the 5-cyano-3-methyl-4-nitropyrazole product, having the formula:

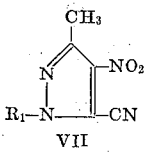
VII is hydrogenated to give a 4-amino-5-cyano-3-methylpyrazole, having the formula:

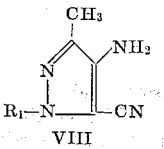
VIII which is finally reacted with 2-thienyl lithium to give the desired 4-amino-3-methyl-5-(2-thenoyl)pyrazole starting material, having the formula:

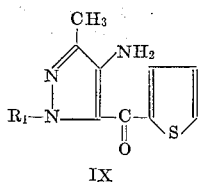
IX

In a second method, a 3-methylpyrazole-5-carboxylic acid, having the formula:

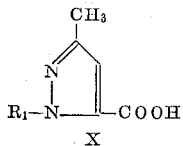
X is nitrated to gave a 3-methyl-4-nitropyrazole-5-carboxylic acid, having the formula:

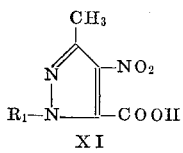
XI which in turn is halogenated, and the acid halide intermediate obtained is reacted with ammonia to give a 3-methyl-4-nitropyrazole-5-carboxamide, having the formula:

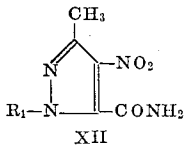
XII

The carboxamide intermediate is then reacted with phosphorus oxychloride to give a 5-cyano-3-methyl-4-nitropyrazole having Formula VII above, which is then further reacted as described earlier to give the desired 4-amino-3-methyl-5-(2-theonyl)pyrazole starting material having Formula IX above.

The 3-methyl-4-(N-methylamino)-5-(2-theonyl)pyrazole starting materials are prepared as follows. The 4-amino-3-methyl-5-(2-theonyl)pyrazole of Formula IX above is reacted with p-toluenesulfonyl chloride in a basic solvent to give the corresponding 3-methyl-5-(2-theonyl)-4-(p-toluenesulfonamido)pyrazole, and this intermediate is reacted with a methylating agent, such as methyl iodide or dimethyl sulfate, in the presence of a base to give the corresponding 3-methyl-4-(N-methyl-p-toluenesulfonamido)-5-(2-theonyl)pyrazole intermediate having the formula:

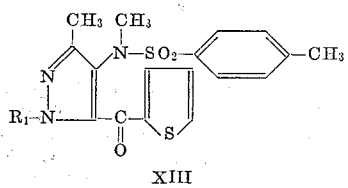
XIII which is reacted with sodium naphthalide in an ethereal solvent to remove the p-toluenesulfonyl group and give the desired 3-methyl-4-(N-methylamino)-5-(2-theonyl)pyrazole starting material having the formula:

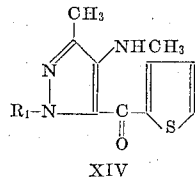
XIV

The foregoing procedures are described in greater detail hereinafter for the preparation of individual compounds. In Formulas IV to XIV, the symbol $R_1$ has the same meaning as previously given.

Also in accordance with the invention, 3-methyl-8-(2-thienyl)pyrazolo[4,3-e][1,4]diazepin-5(1H)-one compounds having Formula I above are produced by reacting a 4-(2-haloacetamido)-3-methyl-5-(2-thenoyl)pyrazole compound having the formula:

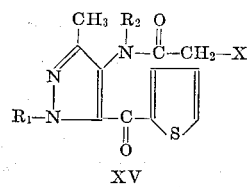
XV or a salt thereof, with ammonia; where $R_1$ and $R_2$ have the aforementioned significance, and X is bromine, chlorine, or iodine, and preferably, bromine. The reaction is best carried out in an unreactive solvent medium. Suitable solvents include lower alkanols, such as methanol, ethanol, and 2-propanol; tertiary amides, such as N,N-dimethylacetamide and N-methyl-2-pyrrolidinone; ethers, such as dioxane, tetrahydrofuran, and 1,2-dimethoxyethane; and halogenated hydrocarbons, such as methylene chloride, chloroform, and carbon tetrachloride; as well as mixtures of these. Excess liquid anhydrous ammonia can also be used as solvent. A preferred solvent is methanol. The temperature is not critical and may be varied from —40 to 100° C., with a temperature in the range of from 15 to 30° C. being preferred. The duration of the reaction is likewise not critical, and at a temperature in the preferred range, the reaction is essentially complete after about 12 to 18 hours. For best results, a large excess of ammonia is employed.

The 4-(2-haloacetamido)-3-methyl-5-(2-thenoyl)pyrazole compounds and salts thereof, used above as starting materials, are prepared by reacting a 4-amino-3-methyl-5-(2-thenoylpyrazole compound having Formula III above with a haloacetyl halide compound having the formula:

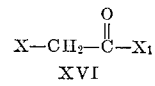
XVI where X is as defined earlier and $X_1$ is bromine or chlorine.

Further in accordance with the invention, 3-methyl-8-(2-thienyl)pyrazolo[4,3-e][1,4]diazepin-5(1H)-one compounds having Formula I are produced by reacting a 4-(2- aminoacetamido) - 3 - methyl-5-(2-thenoyl)pyrazole salt compound having the formula:

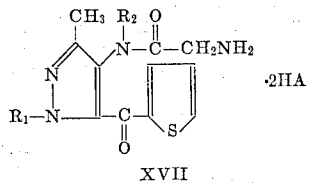

XVII with a sufficient amount of base to neutralize the salt, whereupon the free base 4-(2-aminoacetamido)-3-methyl-5-(2-thenoyl)pyrazole that is liberated undergoes cyclization to give a 3-methyl-8-(2-thienyl)pyrazolo[4,3-e][1,4]diazepin-5(1H)-one compound of the invention; where $R_1$ and $R_2$ have the same meaning as previously given and A represents one equivalent of an anion. The reaction is best carried out in a solvent medium, which may be water or an aqueous lower alkanol. Any of a number of bases may be used, including alkali metal carbonates and bicarbonates, such as sodium carbonate, potassium carbonate, and sodium bicarbonate; alkali metal hydroxides, such as sodium hydroxide and potassium hydroxide; and alkaline earth metal hydroxides, such as magnesium hydroxide. The preferred base is an aqueous alkali metal hydroxide. A large excess of the base is normally used since the cyclization reaction proceeds most rapidly when the reaction mixture is strongly alkaline. The temperature is not critical, and the reaction can conveniently be carried out at room temperature, that is, without external heating or cooling. The duration of the reaction is likewise not critical but is somewhat dependent upon the amount of base employed. Rapid reaction and best results are obtained when the reaction mixture is made strongly basic (pH 10–12).

The 4-(2-aminoacetamido)-3-methyl-5-(2-thenoyl)pyrazole salt compounds required as starting materials in the foregoing process are prepared in a number of ways. For example, the dihydrobromide salts, which are the preferred starting materials, are prepared by reacting a 4-amino-3-methyl-5-(2-thenoyl)pyrazole compound having Formula III above with N-(carbobenzoxy)glycine in the presence of N,N'-dicyclohexylcarbodiimide to give a 4-[2-(carbobenzoxyamino)acetamido] - 3 - methyl-5-(2-thenoyl)pyrazole compound having the formula:

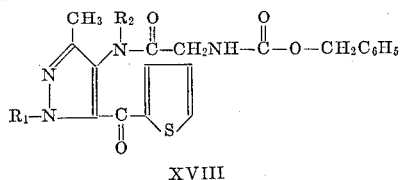

XVIII which is then reacted with hydrogen bromide in acetic acid to give the desired dihydrobromide salt starting material (Formula XVII, A=Br). Other salts, if desired, can then be obtained from the dihydrobromide by anion exchange on a suitable ion exchange resin.

Still further in accordance with the invention, 3-methyl-8 - (2 - thienyl)pyrazolo[4,3-e][1,4]diazepin-5(1H)-one, 7-oxide compounds having Formula II above are produced by reacting a 4-[2-(hydroxylamino)acetamido]-3-methyl-5-(2-thenoyl)pyrazole compound having the formula:

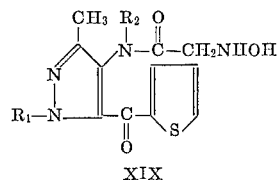

XIX with a strong acid; where $R_1$ and $R_2$ are as perviously defined. Any of a number of strongly acidic inorganic or organic acids may be used, including hydrochloric, hydrobromic, sulfuric, nitric, phosphoric, methanesulfonic, benzenesulfonic, and p-toluenesulfonic acids. A preferred acid is hydrochloric acid. The reaction is advantageously carried out in a nonreactive solvent medium, which can be water, a lower alkanol, a lower alkanoic acid, or a mixture of these. A preferred solvent is a lower alkanol. The temperature and duration of the reaction are not critical and may be varied over a wide range, the temperature from about 20° to about 100° C. and the duration from about 15 minutes to about 48 hours. Preferred conditions are a time of from one to 3 hours and a temperature between 70° and 85° C. At least one equivalent of acid per mole of the pyrazole reactant is required, with an excesses being preferred.

The 4 - [2-(hydroxylamino)acetamido]-3-methyl-5-(2-thenoyl)-pyrazole starting materials are prepared by reacting a 4 - (2 - haloacetamido-3-methyl-5-(2-thenoyl) pyrazole compound having formula XV above with hydroxylamine.

Further yet in accordance with the invention, 3-methyl-8-(2-thienyl)pyrazolo[4,3-e][1,4]diazepin-5(1H)-one, 7-oxide compounds having formula II are produced by reacting a 3-methyl-8-(2-thienyl)pyrazolo[4,3-e][1,4]diazepin-5(1H)-one compound having formula I with an oxidizing agent. The oxidizing agent may be any of a number of organic peracids, including performic, peracetic, perbenzoic, monoperphthalic, pertrifluoroacetic, p-nitroperbenzoic, and m-chloroperbenzoic acids. A preferred oxidizing agent, because of its availability, handling ease, and relative stability, is m-chloroperbenzoic acid. The reaction is best carried out in a nonreactive solvent medium. Suitable solvents include chlorinated hydrocarbons, such as dichloromethane, chloroform, and tetrachloroethane; lower alkanoic acids, such as acetic acid and propionic acid; and tertiary amides, such as N,N-dimethylformamide, N,N-dimethylacetamide, and N-methyl-2-pyrrolidinone; as well as mixtures of these. A preferred solvent is dichloromethane. The reaction can be carried out over a wide range of temperatures, from 10 to 100° C., and durations, from 10 minutes to 48 hours. The preferred temperature is one in the range of 20–35° C., and at such temperature, the reaction is complete after a period of 12–18 hours. While equivalent quantities of the pyrazolodiazepinone compound and oxidizing agent may be used, best results are obtained with an excess of the oxidizing agent.

Additionally in accordance with the invention, 3,4-dimethyl - 8 - (2 - thienyl)pyrazolo[4,3-e][1,4]diazepin-5 (1H)-one compounds having the formula:

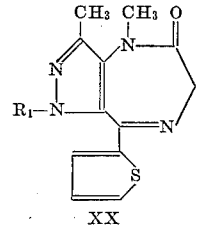

XX and the 7-oxide derivatives thereof are produced by reacting a 3-methyl-8-(2-thienyl)pyrazolo[4,3-e][1,4]diazepin-5(1H)-one compound having the formula:

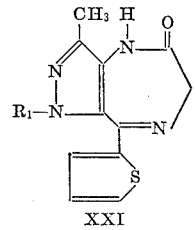

XXI or a 7-oxide derivative thereof with a methylating agent in the presence of a base; where $R_1$ has the same meaning as previously given. Examples of methylating agents that may be used are a methyl halide, especially methyl iodide, methyl sulfate, and a methyl hydrocarbon sulfonate, such as methyl methanesulfonate and methyl p-toluenesulfonate. Bases that may be used include alkali metal hydrides, such as sodium hydride and lithium hydride, alkali metal amides, such as sodamide and potassium amide, and alkali metal alkoxides. Of these, sodium hydride is preferred. The reaction is best carried out in an unreactive solvent medium, which may be a tertiary amide, such as N,N-dimethylformamide, N,N-dimethylacetamide, and N-methyl-2-pyrrolidinone; an ether, such as diethyl ether, tetrahydrofuran, and dioxane; an aromatic hydrocarbon, such as benzene and toluene; dimethylsulfoxide; and mixtures of these. Preferred solvents are N,N-dimethylformamide and dimethylsulfoxide. The temperature and duration of the reaction are not critical and may be varied widely, the temperature from 0 to 100° C. and the duration from one to about 48 hours. The reaction can conveniently be carried out at room temperature, that is, without external heating or cooling, and at that temperature is essentially complete after about 4 hours but may optionally be continued for up to 16 hours to insure completeness. Equimolar quantities of reactants and base may be employed, although a slight excess of any one is not harmful. For optimum yields, it is desirable to use a slight excess of both the methylating agent and base.

The compounds of the invention having Formula I above can exist in the free base form or in the form of an acid-addition salt. Pharmaceutically-acceptable acid-addition salts are formed by reaction of the free 3-methyl-8 - (2 - thienyl)pyrazolo[4,3-e][1,4]diazepin-5(1H)-one compounds with any of a number of inorganic acids, including hydrochloric, hydrobromic, hydriodic, nitric, sulfuric, and phosphoric, and with certain strong organic acids, such as methanesulfonic, benzenesulfonic, and p-toluenesulfonic.

The free 3-methyl-8-(2-thienyl)pyrozolo[4,3-e][1,4]-diazepin-5(1H)-one compounds of Formulas I and II wherein $R_2$ is hydrogen also form pharmaceutically-acceptable salts by reaction with a strong base. Suitable bases for this purpose include alkali metal hydroxides; such as sodium hydroxide, potassium hydroxide, and lithium hydroxide; alkali metal hydrides, such as sodium hydride; alkali metal alkoxides; and alkaline earth metal hydroxides.

The free 3-methyl-8-(2-thienyl)pyrazolo[4,3-e][1,4]-diazepin-5(1H)-one compounds and their salts may differ somewhat in certain physical properties, such as solubility in polar solvents, but they are otherwise equivalent for purposes of the invention.

The compounds of the invention are new chemical compounds that are useful as pharmocological agents. As such, they exert a depressant effect upon the central nervous system that is shown by their ability to prevent the occurrence of convulsions in laboratory animals following the administration of pentamethylenetetrazole and also by their ability to overcome inhibited behavior in animals placed in an anxiety-producing situation.

The anticonvulsant activity of the compounds of the invention is measured in a standard test that is carried out essentially as described by Chen et al., A.M.A. Archives of Neurology and Psychiatry, vol. 66, pages 329–337 (1951), and vol. 68, pages 498–505 (1952), and by Chen et al., Journal of Pharmacology and Experimental Therapeutics, vol. 103, pages 54–61 (1951). In this test, each of a group of 5 rats is given a measured oral dose of a test compound, dissolved in water or suspended with acacia, followed 30 minutes later by a subcutaneous dose of 93 mg./kg. of pentamethylenetetrazole. This quantity of pentamethylenetetrazole quickly produces convulsions in 98–100% of untreated control rats. The treated onimals are then observed visually for 30 minutes following administration of pentamethylenetetrazole, and anticonvulsive activity is judged by noting the time of onset and severity of clonic convulsive seizures and the number of animals completely protected from convulsions. The activity of a test compound at each dosage level is rated as follows: 4+, protection of all 5 rats; 3+, protection of 3 or 4 rats; 2+, protection of one or 2 rats; 1+, delay in onset; 0, no effect.

When tested by the foregoing procedure, 4,6-dihydro-1,3-dimethyl - 8 - (2-thienyl)pyrazolo[4,3-e][1,4]diazepin-5(1H)-one was rated 4+ at doses of 125 mg./kg. and 63 mg./kg., 2–3+ at 32 mg./kg., 1+ at 16 mg./kg., and 0 at 8 mg./kg.; and 1-ethyl-4,6-dihydro-3-methyl-8-(2-thienyl)pyrazolo[4,3-e][1,4]diazepin - 5(1H) - one, 7-oxide was rated 4+ at doses of 250 mg./kg. and 125 mg./kg. and 0 at 63 mg./kg.

The anti-anxiety activity of the compounds of the invention is determined in a test that measures food consumption by rats that have been placed in an anxiety-producing situation. In this test, newly arrived Holtzman male albino rats are allowed to adjust to the laboratory environment for at least 3 days before testing. When tested, the animals are experimentally naive, are under no condition of dietary deprivation, and weigh about 230 grams. After adjustment to the normal laboratory environment, each of a group of 8 rats is given a measured dose of test compound, dissolved in water or suspended in 0.2% aqueous methocel, by oral intubation and is immediately placed in an individual metabolism cage. A 30 minute period is allowed for absorption of the test compound, and then each animal is given access to a milk preparation in a graduated and calibrated tube. The preparation consists of one part sweetened condensed milk and two parts water. The total milk intake of each animal after one and 2 hours is recorded and compared with that of a group of 8 untreated control animals. The animals are also observed for any gross behavioral signs and symptoms. Greater than normal ingestion of milk by the treated animals is regarded as an indication that the test compound, by acting upon the inhibitory brain systems, has suppressed the natural tendency of rodents to become immobilized in a novel, anxiety-producing situation, as represented in the test by the isolation of the metabolism cage. A given dose of test compound is considered active if it causes a mean amount of ingestion greater than 5.0 ml. per animal at the end of the first hour of the test. During this same period, the untreated controls normally consume between 2.0 and 4.0 ml. of milk.

The anti-anxiety activities determined by the foregoing procedure of the two compounds for which anticonvulsant activity data were given above are shown in the following table. The table also shows the results obtained for diazepam and chlordiazepoxide, which are known to be clinically useful for the treatment of anxiety states. The demonstration of activity for diazepam and chlordiazepoxide indicates the validity of the test procedure for determining anti-anxiety activity.

ANTI-ANXIETY ACTIVITY

| Compound | Dose, mg./kg. | Milk intake after 1 hour, ml. |
| --- | --- | --- |
| 4,6-dihydro-1,3-dimethyl-8-(2-thienyl)pyrazolo[4,3-e]-[1,4]diazepin-5(1H)-one | 40 | 8.1 |
| | 20 | 6.1 |
| | 10 | 7.9 |
| | 5 | 5.3 |
| | 2.5 | 6.7 |
| | 1.25 | 4.3 |
| 1-ethyl-4,6-dihydro-3-methyl-8-(2-thienyl)pyrazolo[4,3-e]-[1,4]diazepin-5(1H)-one, 7-oxide | 40 | 7.5 |
| | 20 | 5.5 |
| | 10 | 3.1 |
| Diazepam | 40 | 10.7 |
| | 20 | 12.1 |
| | 10 | 7.4 |
| | 5 | 7.1 |
| | 2.5 | 8.0 |
| Chlordiazepoxide | 40 | 10.7 |
| | 20 | 11.4 |
| | 10 | 8.1 |
| | 5 | 4.7 |

The compounds of the invention are preferably administered orally, as indicated above, although parenteral administration can also be used. They can be combined with either a solid or liquid carrier or diluent and made available in varying amounts in such pharmaceutical forms as tablets, capsules, powders, and aqueous and non-aqueous suspensions and solution.

The invention is illustrated by the following examples.

EXAMPLE 1

A mixture consisting of 8.9 g. of 4-amino-1,3-dimethyl-5-(2-thenoyl)pyrazole, 11.3 g. of glycine ethyl ester hydrochloride, 0.5 ml. of piperidine, and 100 ml. of pyridine is stirred and heated under reflux for 24 hours and then evaporated to dryness under reduced pressure. The residue is mixed well with a small volume of methanol, and to the methanolic mixture is added a solution of 3.2 g. of sodium hydroxide in 40 ml. of water. The aqueous mixture is then cooled, and the 4,6-dihydro-1,3-dimethyl-8-(2-thienyl)pyrazolo[4,3-e][1,4]diazepin-5(1H)-one that precipitates is isolated, washed with water, and dried; M.P. 246–247° C., following crystallization from ethanol with charcoal treatment.

The free base product (2.5 g.) is dissolved in 15 ml. of 5% ethanolic hydrogen chloride, the resulting solution is cooled to 0° C., and the 4,6-dihydro-1,3-dimethyl-8-(2-thienyl)pyrazolo[4,3-e][1,4]diazepin-5(1H)-one, monohydrochloride that precipitates is isolated and crystallized from chloroform-methanol-ether.

The 4-amino-1,3-dimethyl-5-(2-thenoyl)pyrazole starting material is prepared as follows. A mixture consisting of 160 g. of 5-chloro-1,3-dimethyl-4-nitropyrazole, 1.0 g. of sodium iodide, 140 g. of sodium cyanide, and 750 ml. of acetonitrile is stirred and heated under reflux for 20 hours. The mixture is then cooled and filtered, and the filtrate is evaporated to give a residue of 5-cyano-1,3-dimethyl-4-nitropyrazole, which crystallizes upon standing; M.P. 92–93° C., following crystallization from isooctane. A mixture consisting of 33.2 g. of 5-cyano-1,3-dimethyl-4-nitropyrazole, 4.0 g. of Raney nickel, 100 ml. of methanol, and 300 ml. of tetrahydrofuran is shaken with hydrogen at an initial pressure of 50 lbs./in.$^2$ until 3 molecular equivalents of hydrogen are taken up. The catalyst is then removed by filtration, and the filtrate is evaporated to give 4-amino-5-cyano-1,3-dimethylpyrazole; M.P. 100–105° C. A solution of 28 g. of this intermediate in 500 ml. of warm tetrahydrofuran is added dropwise to a stirred solution of 2-thienyl lithium prepared by reacting 92 g. of thiophene with 64 g. of butyl lithium in 90 ml. of heptane. The reaction mixture is stirred and heated at 65° C. for 16 hours, cooled, and treated with one liter of water. The organic phase is separated and extracted with dilute aqueous hydrochloric acid. The acidic aqueous extract is washed with ethyl acetate and made alkaline with aqueous sodium hydroxide, and the alkaline mixture is extracted with ether. The ether extract is washed with water, dried, and evaporated to give the desired 4-amino-1,3-dimethyl-5-(2-thenoyl)pyrazole starting material, isolated as an oil that is suitable for use without further purification.

EXAMPLE 2

A mixture consisting of 29 g. of 4-amino-1-ethyl-3-methyl-5-(2-thenoyl)pyrazole, 33.6 g. of glycine ethyl ester hydrochloride, 1.5 ml. of piperidine, and 180 ml. of pyridine is stirred and heated under reflux for 24 hours and then evaporated to dryness under reduced pressure. The residue is stirred with a small volume of methanol, and to the methanolic mixture is added 100 ml. of 10% aqueous sodium hydroxide. The resulting aqueous mixture is evaporated, the residue is extracted with hot ethanol, and the ethanol extract is filtered. Upon cooling, there is obtained from the filtrate 1-ethyl-4,6-dihydro-3-methyl-8-(2-thienyl)pyrazolo[4,3-e][1,4]diazepin - 5(1H) - one, which is isolated, washed with cold toluene, and dried; M.P. 205–206° C.

The sodium salt is obtained as follows: 1-ethyl-4,6-dihydro-3-methyl - 8 - (2-thienyl)pyrazolo[4,3-e][1,4] diazepin-5(1H)-one (5.3 g.) is stirred with 40 ml. of 0.5 N sodium hydroxide, the resulting mixture is filtered, and the filtrate is subjected to lyophilization. The solid residue obtained is dissolved in 25 ml. of hot N,N-dimethylformamide, and the solution is filtered, cooled, and treated with about 90 ml. of ether to precipitate 1-ethyql-4-6-dihydro - 3 - methyl - 8 - (2-thienyl)pyrazolo[4,3-e][1,4] diazepin-5(1H)-one, sodium salt, which is isolated, washed with ether, and dried.

The 4-amino-1-ethyl-3-methyl-5-(2 - thenoyl)pyrazole starting material is prepared as described in the following.

To a stirred mixture of 35 ml. of 90% nitric acid and 60 g. of fuming sulfuric acid (23% sulfur trioxide) is added in portions, at such a rate so as to maintain the temperature at about 70° C., 29 g. of 1-ethyl-3-methyl-pyrazole-5-carboxylic acid. After addition is complete, the mixture is heated at 95–100° C. for 3 hours, cooled, and poured into ice water. The solid 1-ethyl-3-methyl-4-nitropyrazole-5-carboxylic acid that precipitates is isolated, washed with ice water, and dried; M.P. 157–160° C., following crystallization from ethyl acetate.

A mixture consisting of 30 g. of the foregoing product, 20 g. of thionyl chloride, 3.0 ml. of N,N-dimethylformamide, and 200 ml. of toluene is stirred and heated at 95° C. for 2 hours, then cooled, and poured into ice water. The aqueous mixture is stirred for about 10 minutes, and the toluene layer is separated, washed with 10% aqueous potassium carbonate, dried, and evaporated to give a residue of 1-ethyl-3-methyl-4-nitropyrazole-5-carbonyl chloride, which is used in the next reaction step without further purification.

To a stirred solution of 54.5 g. of the above acid chloride product in 50 ml. of acetone, cooled in a Dry Ice bath, is added in portions 50 ml. of 30% aqueous ammonia, and the solid 1-ethyl-3-methyl-4-nitropyrazole-5-carboxamide that precipitates is isolated and crystallized from acetonitrile; M.P. 175–176° C. A mixture of 60 g. of this carboxamide intermediate and 350 ml. of phosphorus oxychloride is stirred and heated under reflux for 3 hours, and the resulting solution is evaporated under reduced pressure to give a residue of 5-cyano-1-ethyl-3-methyl-4-nitropyrazole, which crystallizes upon standing; M.P. 60.5–61.5° C., following crystallization from chloroform-ligroin. A mixture consisting of 45 g. of this pyrazole intermediate, 5.0 g. of Raney nickel, 100 ml. of methanol, and 300 ml. of tetrahydrofuran is shaken with hydrogen at an initial pressure of 50 lbs./in.$^2$ until 3 molecular equivalents of hydrogen are taken up. The catalyst is then removed by filtration, and the filtrate is evaporated to give 4-amino-5-cyano-1-ethyl-3-methylpyrazole; M.P. 82–84° C., following crystallization from isooctane.

A solution of 2-thienyl lithium is prepared by adding 92 g. of thiophene to a solution of 64 g. of butyl lithium in 90 ml. of heptane. To this solution is added dropwise with stirring a solution of 34 g. of 4-amino-5-cyano-1-ethyl 3-methylpyrazole in 250 ml. of tetrahydrofuran, and the resulting mixture is stirred and heated under reflux for one hour and at room temperature for 16 hours. The mixture is treated with one liter of water, and the organic phase is separated and evaporated under reduced pressure. The residue is dissolved in ether, and the ethereal solution is extracted with dilute aqueous hydrochloric acid. The acidic extract is washed with ethyl acetate and made alkaline with aqueous sodium hydroxide, and the alkaline mixture is extracted successively with ether, benzene, and ethyl acetate. The combined extracts are dried and evaporated under reduced pressure to give the desired 4-amino-1-ethyl-3-methyl-5-(2-thenoyl)pyrazole starting material obtained as an oil that it suitable for use without further purification.

EXAMPLE 3

Utilizing the procedure described in Example 1 above, from the reaction of 9.3 g. of 1-ethyl-3-methyl-4-(methylamino)-5-(2-thenoyl)pyrazole and 11.4 g. of glycine ethyl ester hydrochloride in a mixture of 100 ml. of pyridine and 1.0 ml. of piperidine, there is obtained 1-ethyl-4,6-dihydro-3,4-dimethyl - 8-(2-thienyl)pyrazolo[4,3-e][1,4] diazepin-5(1H)-one.

The starting material is prepared as follows. A mixture consisting of 9.3 g. of 4-amino-1-ethyl-3-methyl-5-(2-thenoyl)pyrazole, 8.5 g. of p-toluenesulfonyl chloride, and 150 ml. of pyridine is stirred and heated under reflux for 90 minutes, cooled, and diluted with 300 ml. of ice water. The solid 1-ethyl-3-methyl-5-(2-thenoyl)-4-(p-toluenesulfonamido)pyrazole that precipitates is isolated, washed with water, and dried. To a stirred mixture of 2.0 g. of 50% sodium hydride in mineral oil dispersion and 30 ml. of N,N-dimethylformamide at room temperature is added in portions 13.7 g. of the foregoing intermediate product. The resulting mixture is stirred for 30 minutes, 8.8 g. of dimethyl sulfate is added dropwise, and stirring is continued at room temperature for 2 hours. The mixture is then concentrated under reduced pressure and diluted with ethyl acetate, and the ethyl acetate solution is washed with water, with 4% aqueous sodium hydroxide, and with saturated aqueous sodium chloride, dried, and evaporated to give 1-ethyl-3-methyl-4-(N-methyl-p-toluenesulfonamido)-5-(2-thenoyl)pyrazole. A mixture consisting of 2.3 g. of sodium, 13 g. of naphthalene, and 150 ml. of 1,2-dimethoxyethane is stirred under nitrogen at room temperature for 90 minutes, and to the resulting solution is added a solution of 12.2 g. of 1-ethyl-3-methyl 4-(N-methyl-p-toluenesulfonamido) - 5 - (2 - thenoyl) pyrazole in 100 ml. of 1,2-dimethoxyethane. The mixture is stirred at room temperature for 2 hours and is then cautiously treated with about 35 ml. of water and diluted with an equal volume of ethyl acetate. The aqueous phase is discarded, and the organic phase is washed with saturated aqueous sodium chloride and extracted with 200 ml. of 1 N hydrochloric acid. The acidic aqueous extract is then made strongly alkaline with 30% aqueous sodium hydroxide, and the alkaline mixture is extracted with ether. The ether extract is washed with water, dried, and evaporated to give the desired 1-ethyl-3-methyl-4-(methylamino)-5-(2-thenoyl)pyrazole starting material, isolated as an oil that is suitable for use without further purification.

EXAMPLE 4

A stirred solution of 8.8 g. of 4-amino-1,3-dimethyl-5-(2-thenoyl)pyrazole in 100 ml. of ether at room temperature is treated 5 times as follows: 1.0 ml. of bromoacetyl bromide is added, and the resulting mixture is stirred for 5 minutes and then washed with 150 ml. of water. After the fifth treatment, the reaction mixture is washed with water until neutral, and the resulting ethereal solution is dried and evaporated under reduced pressure. The residue, which is 4-(2-bromoacetamido)-1,3-dimethyl-5-(2-thenoylpyrazole is dissolved in 100 ml. of methanol, and to the solution is added 250 ml. of 15% ammonia in methanol solution. The resulting mixture is kept at room temperature for 16 hours and evaporated to dryness under reduced pressure. The residue is shaken with a mixture of 100 ml. of methylene chloride and 100 ml. of water, and the methylene chloride phase is separated, dried, and evaporated to give 4,6-dihydro-1,3-dimethyl-8-(2-thienyl) pyrazolo[4,3-e][1,4]diazepin-5(1H)-one; M. P. 246–247° C., following crystallization from ethanol.

The sodium salt is obtained as follows. 4,6-dihydro-1,3-dimethyl - 8 - (2-thienyl)pyrazolo[4,3-e][1,4]diazepin-5(1H)-one (4.9 g.) is stirred with 40 ml. of 0.5 N sodium hydroxide, the resulting mixture is filtered, and the filtrate is lyophilized. The solid residue that is obtained is dissolved in about 25 ml. of hot N,N-dimethylformamide, and the solution is filtered, cooled, and treated with about 90 ml. of ether to precipitate 4,6-dihydro-1,3-dimethyl-8-(2-thienyl)pyrazolo-[4,3-e][1,4]diazepin-5(1H)-one, sodium salt, which is isolated, washed with ether, and dried.

Utilizing the foregoing procedures, with the substitution of 9.4 g. of 4-amino-1-ethyl-3-methyl-5-(2-thenoyl)pyrazole for the 4-amino-1,3-dimethyl-5-(2-thenoylpyrazole, there are obtained 1-ethyl-4,6-dihydro-3-methyl-8-(2-thienyl)pyrazolo[4,3-e][1,4]diazepin-5(1H)-one and the sodium salt thereof.

EXAMPLE 5

A solution of 21 g. of 4-(2-aminoacetamido)-1-ethyl-3-methyl-5-(2-thenoyl)pyrazole dihydrobromide in 100 ml. of water at room temperature is made strongly alkaline by the addition of 50% aqueous sodium hydroxide, and the resulting mixture is extracted several times with methylene chloride. The combined extracts are washed with water, dried, and evaporated under reduced pressure to give 1-ethyl-4,6-dihydro-3-methyl-8-(2-thienyl) pyrazolo[4,3-e][1,4]diazepin-5(1H)-one; M.P. 205–206° C., following crystallization from ethanol.

The free base product (2.5 g.) is dissolved in 15 ml. of 5% ethanolic hydrogen chloride. The resulting solution is cooled to 0° C., and the 1-ethyl-4,6-dihydro-3-methyl-8-(2-thienyl)pyrazolo[4,3-e][1,4]diazepin - 5(1H) - one, monohydrochloride that precipitates is isolated and crystallized from chloroform-methanol-ether.

Utilizing the foregoing procedures, with the substitution of 20 g. of 4-(2-aminoacetamido)-1,3-dimethyl-5-(2-thenoyl)-pyrazole dihydrobromide for the 4-(2-aminoacetamido)-1-ethyl-3-methyl-5-(2-thenoyl)pyrazole dihydrobromide, there are obtained 4,6-dihydro-1,3-dimethyl-8-(2-thienyl)pyrazolo[4,3-e][1,4]diazepin - 5(1H) - one and the monohydrochloride salt thereof.

The 4-(2-aminoacetamido)-1-ethyl - 3 - methyl-5-(2-thenoyl)-pyrazole dihydrobromide starting material is obtained as follows. A mixture consisting of 19 g. of 4-amino-1-ethyl-3-methyl-5-(2-theonyl)pyrazole, 15 g. of N-(carbobenzoxy)glycine, 16 g. of N,N-dicyclohexylcarbodiimide, and 300 ml. of ethyl acetate is stirred and heated under reflux for 16 hours, cooled, and filtered. The filtrate is washed with dilute aqueous sodium bicarbonate and with dilute hydrochloric acid, dried, and evaporated to give 4-[2-(carbobenzoxyamino)acetamido]-1-ethyl-3-methyl-5-(2-thenoyl)pyrazole. A solution of 21 g. of this intermediate product in 200 ml. of 20% hydrogen bromide in acetic acid solution is kept at room temperature for 2 hours and is then poured into one liter of ether to precipitate the desired 4-(2-aminoacetamido)-1-ethyl-3-methyl-5-(2-thenoyl)pyrazole starting material, which is isolated, washed with ether, and dried.

The 4-(2-aminoacetamido) - 1,3 - dimethyl-5-(2-thenoyl)-pyrazole starting material is prepared in a similar manner by substituting 18.1 g. of 4-amino-1,3-dimethyl-5-(2-thenoyl)-pyrazole for the 4-amino-1-ethyl-3-methyl-5-(2-thenoyl)-pyrazole in the foregoing procedure.

EXAMPLE 6

A solution of 27.2 g. of 4-(2-bromoacetamido)-1-ethyl-3-methyl-5-(2-thenoyl)pyrazole in 200 ml. of ethanol is added to an aqueous solution of hydroxylamine prepared by dissolving 21.3 g. of hydroxylamine hydrochloride in a mixture of 24.5 g. of 50% aqueous sodium hydroxide and 120 ml. of water. The resulting mixture is stirred at room temperature for 19 hours and then evaporated under reduced pressure to a volume of about 100 ml. The residue, which crystallizes upon standing, is mixed well with 100 ml. of water, and the aqueous mixture is cooled to give solid 1-ethyl-4-[2-(hydroxyamino)acetamido]-3-methyl-5-(2-thenoyl)pyrazole, which is collected and dried; M.P. 146–152° C. This intermediate product is dissolved in 150 ml. of isopropyl alcohol, and the solution is made strongly acid with isopropanolic hydrogen chloride. The acid solution is heated under reflux for 2 hours and then evaporated under reduced pressure. The residue is dissolved in ethyl acetate, and the solution is washed with saturated aqueous sodium bicarbonate, dried, and evaporated to give 1-ethyl-4,6-dihydro-3-methyl - 8 - (2-thienyl)pyrazolo[4,3-e][1,4]diazepin-5(1H)-one, 7-oxide; M.P. 226–227.5° C., following crystallization from ethanol.

Utilizing the foregoing procedure, with the substitution of 26 g. of 4-(2-bromoacetamido)-1,3-dimethyl-5-(2-thenoyl)-pyrazole for the 4-(2-bromoacetamido)-1-ethyl-3-methyl-5-(2-thenoyl)pyrazole, there is obtained 4,6-dihydro-1,3-dimethyl - 8 - (2-thienyl)pyrazolo[4,3-e][1,4]diazepin-5(1H)-one, 7-oxide.

The 4-(2-bromoacetamido)-1-ethyl - 3 - methyl-5-(2-thenoyl)-pyrazole starting material is prepared as follows.

A solution of 109 g. of 1-ethyl-3-methyl-4-nitropyrazole-5-carbonyl chloride and 66.5 g. of aluminum chloride in 500 ml. of dichloromethane is added to a stirred solution of 341 ml. of thiophene in about 2 liters of dichloromethane, and the resulting mixture is stirred for one hour at room temperature. It is then poured into a mixture of ice and 100 ml. of concentrated hydrochloric acid, and the acidic aqueous mixture is stirred for 16 hours at room temperature and then diluted with 500 ml. of toluene. The organic phase is separated, washed with water, dried, and evaporated, and the residue is distilled under reduced pressure to give 1-ethyl-3-methyl-4-nitro-5-(2-thenoyl)pyrazole, collected between 125° and 148° C. at 1 mm. Hg; M.P. 79–80° C., following crystallization from methanol.

To a stirred mixture consisting of 53 g. of 1-ethyl-3-methyl-4-nitro-5-(2-thenoyl)pyrazole, 55.8 g. of iron powder, 300 ml. of ethanol, and 200 ml. of water at 49° C. is added 4.0 ml. of concentrated hydrochloric acid, and the resulting mixture is stirred for one hour at room temperature and then stirred and heated under reflux for an additional hour. Upon cooling, the mixture is filtered with the aid of diatomaceous silica, and the filter cake is washed with four 100 ml. portions of hot ethanol. The combined filtrate and washings are concentrated to remove most of the ethanol, and the aqueous concentrate is extracted with ether. The ether extract is washed with dilute aqueous sodium hydroxide and with water and is then dried and evaporated to give 4-amino-1-ethyl-3-methyl-5-(2-thenoyl)pyrazole as an oil that is suitable for use without further purification.

A solution of 44 g. of the above product in 300 ml. of ethyl acetate is cooled to 10° C., 39.7 g. of bromoacetyl bromide is added, and the resulting mixture is stirred at room temperature for 15 minutes. It is then poured over a mixture of ice and dilute aqueous sodium hydroxide. The organic phase is separated, and the aqueous phase is extracted twice with ethyl acetate. The ethyl acetate extracts are combined with the previously separated organic phase, and the combined solution is dried and evaporated to give the desired 4-(2-bromoacetamido)-1-ethyl-3-methyl-5-(2-thenoyl)pyrazole starting material; M.P. 152–159° C., following crystallization from isopropyl alcohol.

EXAMPLE 7

To a solution of 27.4 g. of 1 - ethyl - 4,6 - dihydro-3 - methyl - 8 - (2 - thienyl)pyrazolo[4,3-e][1,4]diazepin-5(1H)-one in 550 ml. of dichloromethane is added with stirring 22 g. of 85% m-chloroperbenzoic acid. After the initial exothermic reaction subsides, the reaction mixture is kept at room temperature for 16 hours and is then shaken with a solution of 20 g. of sodium bicarbonate in 400 ml. of water, and the organic phase is separated, dried, and evaporated to give 1 - ethyl - 4,6 - dihydro-3-methyl - 8 - (2 - thienyl)pyrazolo[4,3-e][1,4]diazepin-5(1H)-one, 7-oxide; M.P. 226–227.5° C., following crystallization from ethanol.

Utilizing the foregoing procedure, the following 3-methyl - 8 - (2 - thienyl)pyrazolo[4,3-e][1,4]diazepin-5(1H)-one, 7-oxides are obtained from the reaction of 85% m-chloroperbenzoic acid with the indicated amounts of the starting compounds designated below:

(a) From 26 g. of 4,6 - dihydro - 1,3 - dimethyl-8-(2 - thienyl)pyrazolo[4,3-e][1,4]diazepin - 5(1H) - one there is obtained 4,6 - dihydro - 1,3 - dimethyl - 8 - (2-thienyl)pyrazolo[4,3-e][1,4]diazepin-5(1H)-one, 7-oxide.

(b) From 28.8 g. of 1 - ethyl - 4,6 - dihydro - 3,4-dimethyl - 8 - (2 - thienyl)pyrazolo[4,3-e][1,4]diazepin-5(1H)-one there is obtained 1 - ethyl - 4,6 - dihydro-3,4 - dimethyl - 8 - (2 - thienyl)pyrazolo[4,3-e][1,4]diazepin - 5(1H) - one, 7-oxide; M.P. 189–191.5° C., following 2 crystallizations from isopropyl alcohol.

EXAMPLE 8

To a stirred mixture of 1.0 g. of 50% sodium hydride in mineral oil dispersion and 35 ml. of N,N-dimethylformamide at room temperature is added in portions 5.1 g. of 4,6 - dihydro - 1,3 - dimethyl - 8 - (2-thienyl)pyrazolo[4,3-e][1,4]diazepin - 5(1H) - one. The resulting mixture is stirred for 30 minutes, 3.0 ml. of dimethyl sulfate is added, and stirring is continued for 16 hours at room temperature. The reaction mixture is then poured into 200 ml. of water, and the aqueous mixture is extracted with methylene chloride. The methylene chloride extract is washed with water, dried, and evaporated to give 4,6 - dihydro - 1,3,4 - trimethyl - 8 - (2-thienyl)pyrazolo[4,3-e][1,4]diazepin-5(1H)-one.

Utilizing the foregoing procedure, with the substitution of 5.3 g. of 1 - ethyl - 4,6 - dihydro - 3 - methyl - 8 - (2-thienyl)pyrazolo[4,3-e][1,4]diazepin - 5(1H) - one for the 4,6 - dihydro - 1,3 - dimethyl - 8 - (2 - thienyl) pyrazolo[4,3-e][1,4]diazepin - 5(1H) - one, there is obtained 1- ethyl - 4,6 - dihydro - 3,4 - dimethyl - 8 - (2-thienyl)pyrazolo[4,3-e][1,4]diazepin-5(1H)-one.

EXAMPLE 9

To a stirred mixture of 1.06 g. of 56.6% sodium hydride in mineral oil dispersion and 10 ml. of dimethyl sulfoxide is added a solution of 7.16 g. of 1 - ethyl-4,6-dihydro - 3 - methyl - 8 - (2 - thienyl)pyrazolo[4,3-e][1,4]diazepin - 5(1H) - one, 7-oxide in 30 ml. of dimethyl sulfoxide while the temperature is maintained below 18° C. The resulting mixture is stirred at 15° C. for 10 minutes and is then treated with 3.6 g. of methyl iodide. The new reaction mixture is stirred at room temperature for 90 minutes, 10 drops more of methyl iodide are added, and the mixture is stirred for 30 minutes more. It is then washed with pentane and poured into 600 ml. of ice water. The resulting aqueous mixture is extracted with ethyl acetate, and the ethyl acetate extract is washed with water, dried, and evaporated to give 1 - ethyl - 4,6-dihydro - 3,4 - dimethyl - 8 - (2 - thienyl)pyrazolo[4,3-e][1,4]diazepin - 5(1H) - one, 7-oxide; M.P. 189–191.5° C., following 2 crystallizations from isopropyl alcohol.

Utilizing the foregoing procedure, with the substitution of 6.8 g. of 4,6 - dihydro - 1,3 - dimethyl - 8 - (2-thienyl) pyrazolo[4,3-e][1,4]diazepin - 5((1H) - one, 7-oxide for the 1 - ethyl - 4,6 - dihydro - 3 - methyl - 8 - (2 - thienyl) pyrazolo[4,3-e][1,4]diazepin - 5(1H) - one, 7 - oxide, there is obtained 4,6 - dihydro - 1,3,4 - trimethyl - 8 - (2-thienyl)pyrazolo[4,3-e][1,4]diazepin - 5 - (1H) - one, 7-oxide.

What is claimed is:

1. A member of the class consisting of 3 - methyl-8-(2 - thienyl)pyrazolo[4,3-e][1,4]diazepin - 5(1H) - one compounds having the formula:

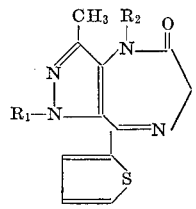

3 - methyl - 8 - (2 - thienyl)pyrazolo[4,3-e][1,4]diazepin-5(1H)-one, 7-oxide compounds having the formula:

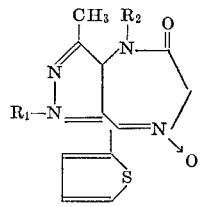

and pharmaceutically-acceptable salts of the foregoing compounds; where $R_1$ is a member of the class consisting of methyl and ethyl and $R_2$ is a member of the class consisting of hydrogen and methyl.

2. A compound according to claim 1 which is 4,6-dihydro - 1,3 - dimethyl - 8 - (2 - thienyl)pyrazolo [4,3-e][1,4]diazepin-5(1H)-one.

3. A compound according to claim 1 which is 1-ethyl-4,6 - dihydro - 3 - methyl - 8 - (2 - thienyl)pyrazolo [4,3-e][1,4]diazepin-5(1H)-one.

4. A compound according to claim 1 which is 1-ethyl-4,6 - dihydro - 3 - methyl - 8 - (2 - thienyl)pyrazolo [4,3-e][1,4]diazepin-5(1H)-one, 7-oxide.

References Cited
UNITED STATES PATENTS

| | | | |
|---|---|---|---|
| 3,313,805 | 4/1967 | Bell | 260—239.3 |
| 3,336,296 | 8/1967 | Bell et al. | 260—239.3 |
| 3,371,085 | 2/1968 | Reecler et al. | 260—239.3 |

HENRY R. JILES, Primary Examiner

R. T. BOND, Assistant Examiner

U.S. Cl. X.R.

424—273; 260—310